Patented Nov. 22, 1938

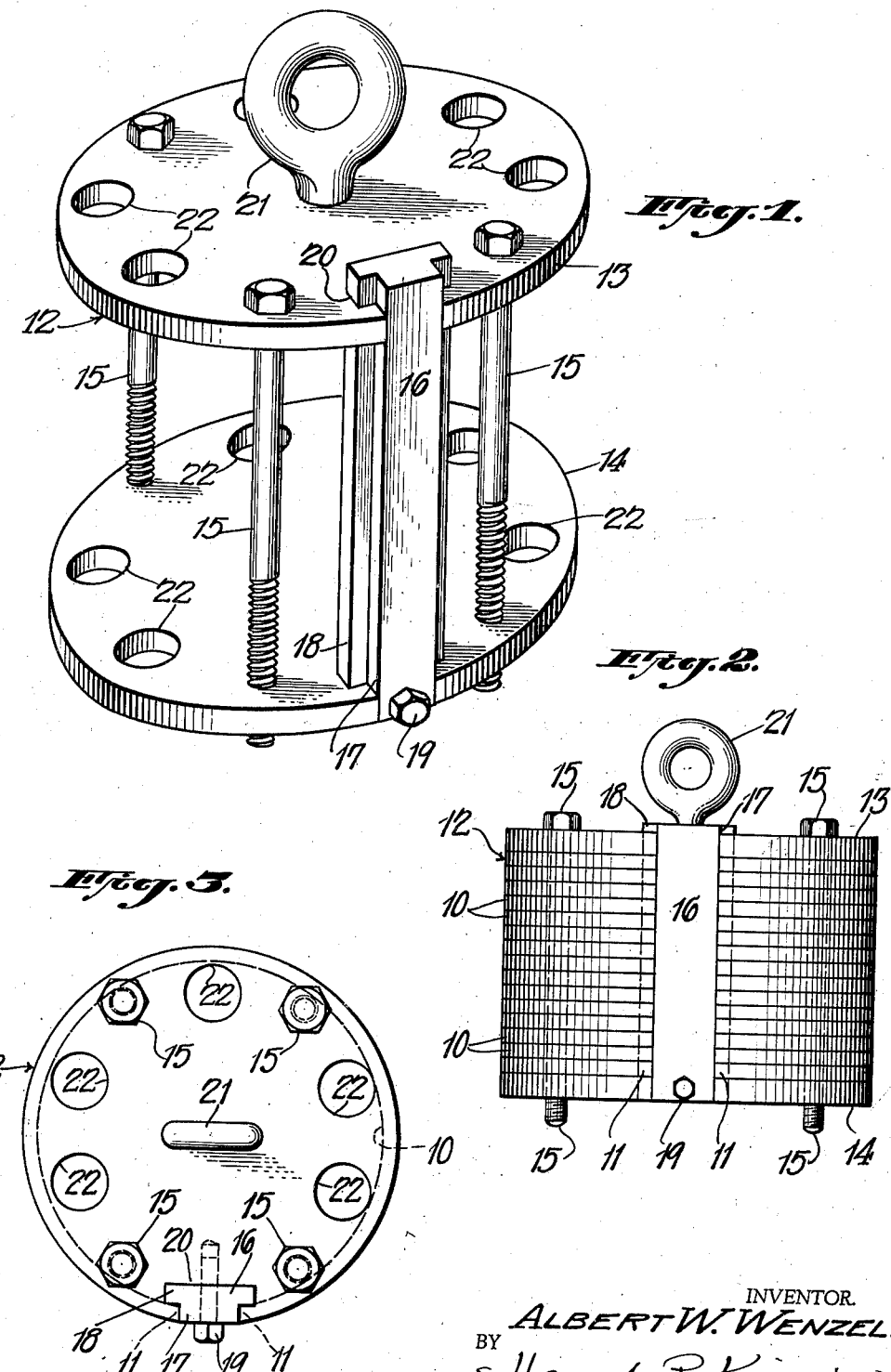

2,137,737

UNITED STATES PATENT OFFICE 2,137,737

PACKING RING HOLDING APPARATUS

Albert W. Wenzel, West Orange, N. J.

Application April 13, 1937, Serial No. 136,546

1 Claim. (Cl. 266—2)

This invention relates to packing ring holding apparatus. It relates more particularly to packing rings for use in the pistons and cylinders of internal combustion engines.

The primary function of a packing ring, especially in an internal combustion engine is to seal against passage of gas or compression between a cylinder and piston. As a result of the present day trend of engine design and especially of increased speed both of the engine and of the vehicle in which used, including airplanes, it is necessary to take into consideration the increased strain upon the rings, the increased contracting moment of force operative thereon in use resulting from the more rapid and more incessant oscillation thereof, the high temperatures involved requiring superior heat resistance, and so on. Heretofore the rings have been fabricated from cast iron and tensioned by various means, but the material used and methods of tensioning the same have failed under the more severe requirements of the industry, and according to the present invention I propose the use of steel, steel alloy and other materials that can be hardened by such process as nitriding, as the material of which the rings are made. An object of the invention is accordingly to provide for the fabrication of a satisfactory piston or other packing ring from a non-porous metal of the nature of steel, steel alloys, etc.

I have experimented over a long period with steel as a material for the fabrication of piston rings, but have encountered problems of baffling magnitude which the present invention has solved. Outstanding of the difficulties encountered has been the inability to retain the machined shape of the rings when passing through the necessary tempering or hardening operation. An object of the invention is to provide a method and to secure a steel ring which may be hardened and maintained true to its given shape.

Other objects of the invention will in part be obvious and will in part appear hereinafter as the description proceeds.

The invention accordingly comprises the several steps and the relation of one or more of such with respect to each of the others, and the ring possessing the features, properties, and the relation of the elements, which are exemplified in the following detailed disclosure, and the scope of the application of which will be indicated in the claim.

For a fuller understanding of the nature and objects of the invention reference should be had to the following detailed description taken in connection with the accompanying drawing, in which:—

Figure 1 is a perspective view of a jig employed in treatment of the rings;

Figure 2 is a side elevation of the same with the rings mounted therein; and

Figure 3 is a plan of the jig showing the rings therein by dotted line.

In the specific embodiment of the invention illustrated in said drawing, the reference numeral 10 designates a packing ring of which a plurality are shown stacked in Fig. 2 with their flat faces juxtaposed and their peripheral faces substantially alined in a common cylindrical surface. The rings are of steel, so as to be subject to hardening processes and thus susceptible to inherent resiliency of permanent and strong effectiveness. The moment of force necessary to compress a steel ring and especially a tempered steel ring is very much greater than in a cast iron ring. Piston wabble or slap, high compression and high speed of an engine will therefore be less likely to result in the ring compressing and passing either the compression or the oil. The ring is, as usual, radially severed at one part thereof, thus providing "ends" 11, 11 these ends in the present showing being of the butt-end type.

The rings are mounted on a jig 12 during the tempering process, this jig being clearly shown in Fig. 1 as comprising a pair of preferably circular plates 13, 14 which for convenience of description will be designated upper and lower plates respectively. The upper plate 13 is shown with four bolts 15 passing downwardly through the same and screwed into lower plate 14. All of these bolts are parallel and near the periphery of the plates with a spacing therefrom preferably equal to the thickness of the rings 10 so the rings may rest at their inner peripheries against the bolts and be held in place thereby. After the rings are placed the bolts are screwed home, thus clamping the rings tightly one upon the other between the plates.

It is preferable to have the rings held in expanded position, that is, with the "ends" separated during the tempering operation. For this purpose, I provide a spreading-bar 16, here shown as of T-shape in cross-section, which bar is parallel to the bolts and next the periphery of the plates. This spreading-bar 16 has its shank portion 17 of less width (in a direction peripherally of the plates) than its head portion 18. The head portion 18 is radially nearer to the center of the plates and the shank portion extends to the periphery of the plates. The lower end of the spreading-bar is preferably secured to lower plate 14, as by radially disposed bolt 19, and the upper end of the spreading-bar slides in an appropriate opening 20 through the plate so as to permit the plates to be moved toward and away from each other for clamping the rings or for removing them. The chosen width of shank 17 will determine the ultimate ring tension desired in the rings.

The bolts may be threaded a considerable distance from their ends so as to accommodate as many or as few rings as desired to treat at one time. The top plate is provided with a central eyelet or lifting ring 21. The plates provide means for admitting fluid to the inner circumferences of the rings, and by way of illustration are shown with a plurality of holes or openings 22 through them. It is not to be understood, however, that the invention is restricted as to size or shape of these openings 22, so long as they provide ample circulation facilities for the quenching fluid employed in the process described below.

In carrying out the steps involved in the said process or method herein involved, the rings are preferably first finished or machined to size and with the desired surfaces ground or otherwise ready for use. If desired, however, the rings may be partly finished at this stage, and given a final finish by subsequent slight machining, polishing or otherwise, after subjection to the hardening process described below. With the rings thus prepared in finished or substantially finished state except for tempering and possibly a final finishing cut or polish, top plate 13 of the jig is preferably removed and the rings applied in a stack upon the bottom plate with the "ends" of the rings all spread and engaging against the side edge of the shank of the spreading-bar. After the desired number have been applied, the top plate 13 is replaced and clamped tight by the bolts. The jig, with rings thus mounted thereon, is then exposed to the tempering treatment for the rings which of necessity cannot change their shape or position. It is found after treatment that the rings are "set" and yet have not been warped or adversely affected. It will be observed that only the peripheries of the rings are exposed during treatment, the side or flat faces thereof being protected by engagement with each other and with the plates.

The treatment of the rings may be a heat treatment to a dull red or otherwise, followed by quenching in suitable liquid, such as oil. Both the heating and quenching are performed while the rings are clamped in the jig with their "ends" spread. Other treatments than this particular one may be employed, if desired, such as a cyanide treatment, or nitriding or otherwise to effect a "setting" of the molecular structure and an increased tensioning of the resilient properties of the steel, or similar material employed. The same treatment may also be applied to rings of cast iron or other materials with results improving their resilient properties without any detrimental effects of warping or otherwise. The holes or openings 22 in the plates 13 and 14 permit circulation of the heat and liquid to the inner peripheries of the rings.

Since this and other changes may be made in the jig and ring structure, their parts and materials and in the processes of manufacture or methods of utilizing the jig or forming the ring or uses of the structure described above without departing from the scope of the invention, it is intended that all matter contained in the above description or shown in the accompanying drawing shall be interpreted as illustrative and not in a limiting sense. It is also to be understood that the following claim is intended to cover all of the generic and specific features, methods, combinations and sub-combinations of the invention herein described and all statement of the scope of the invention which, as a matter of language, might be said to fall therebetween.

I claim:—

A jig as characterized, comprising clamping plates, a spreading bar between said plates next the periphery thereof for holding and spreading piston rings or the like, and bolts perpendicular to said plates extending from one to the other thereof and through the same inward of the peripheries of said plates so as to be within the piston rings or the like clamped by said plates, said bolts clamping said plates to the rings with the peripheries only of the rings exposed, said spreading bar being attached to one of said clamping plates and slidable with respect to the other of said clamping plates for permitting adjustment of said plates to receive varying numbers of rings therebetween and to permit movement of the plates toward and away from each other for clamping purposes, said clamping plate through which the spreading bar is slidable having means for retaining the spreading bar from displacement in a direction radially outward from the said plate.

ALBERT W. WENZEL.